(12) United States Patent  
Zhang et al.

(10) Patent No.: US 6,699,620 B2  
(45) Date of Patent: Mar. 2, 2004

(54) LEAD ALLOY SURFACE COATING FOR POSITIVE LEAD-ACID BATTERY GRIDS AND METHODS OF USE

(75) Inventors: Lu Zhang, Carmel, IN (US); John Lewis Ayres, Cicero, IN (US)

(73) Assignee: Delphi Technologies, Inc., Troy, MI (US)

(*) Notice: Subject to any disclaimer, the term of this patent is extended or adjusted under 35 U.S.C. 154(b) by 194 days.

(21) Appl. No.: 09/909,261

(22) Filed: Jul. 19, 2001

(65) Prior Publication Data

US 2003/0017399 A1 Jan. 23, 2003

(51) Int. Cl.[7] .......................... H01M 4/73; H01M 4/66
(52) U.S. Cl. ...................... 429/245; 429/233; 429/236; 29/2
(58) Field of Search ................ 429/233, 236, 429/242, 245; 29/2

(56) References Cited

U.S. PATENT DOCUMENTS

| | | | |
|---|---|---|---|
| 4,761,356 A | 8/1988 | Kobayashi et al. | 429/242 |
| 4,805,277 A | 2/1989 | Yasuda et al. | 29/2 |
| 4,906,540 A | 3/1990 | Hoshihara et al. | 429/242 |
| 4,939,051 A | 7/1990 | Yasuda et al. | 429/245 |
| 5,298,350 A | * 3/1994 | Rao | 429/245 |
| 5,368,961 A | 11/1994 | Juergens | 429/233 |
| 5,858,575 A | 1/1999 | Chen | 429/245 |
| 6,037,081 A | 3/2000 | Kashio et al. | 429/242 |
| 6,057,059 A | * 5/2000 | Kwok et al. | 429/235 |
| 6,117,196 A | 9/2000 | Snyder et al. | 29/623.5 |
| 6,117,594 A | * 9/2000 | Taylor et al. | 429/245 |

OTHER PUBLICATIONS

K. Takahaski, H. Yasuda, K. Yonezu and H. Okamoto; "Techniques to reduce failure in lead–calicum batteries using expanded type grids"; Journel of Power Sources, 42 (1993) 221–230, no month.

* cited by examiner

Primary Examiner—Patrick Ryan
Assistant Examiner—Tracy Dove
(74) Attorney, Agent, or Firm—Jimmy L. Funke

(57) ABSTRACT

A lead alloy coating for a positive grid of a lead acid battery is provided. The lead alloy coating includes a tin content of at least about 0.1%, but not more than about 3%; and a residual lead content. The lead alloy coating optionally includes a calcium content of at least about 0.01%, but not more than about 0.1%, with or without a silver content of at least about 0.01%, but not more than about 0.1%. Alternatively, the lead alloy coating optionally includes a barium content of at least about 0.01%, but not more than about 0.1%, with or without a silver content of at least about 0.01%, but not more than about 0.1%.

25 Claims, 5 Drawing Sheets

LEAD ALLOY SURFACE COATING FOR POSITIVE LEAD-ACID BATTERY GRIDS AND METHODS OF USE

TECHNICAL FIELD

This application relates generally to positive grids for lead acid batteries. More specifically, this application relates to lead alloy coatings for the positive grids of lead acid batteries and methods of using such coatings.

BACKGROUND

Lead-acid batteries are multi-cell structures with each cell containing a positive plate or electrode, a negative plate or electrode, and an electrolyte. Each plate consists of a grid of expanded metal having a layer of electrochemically active material formed thereon.

The structure of the positive plate, namely the grid structure and grid material, affects the life and current generating efficiency of the battery. The grid is expanded from a strip of lead or lead alloy. For example, U.S. Pat. Nos. 3,853,626 and 3,945,097 to Daniels et al. describe exemplary methods and equipment for making such expanded grids and are herein incorporated by reference in their entirety.

The active material is applied to the grid after expansion. The active material on positive plates is typically lead dioxide ($PbO_2$), while the active material on the negative plates is typically sponge lead. Normally, a precursor to the lead dioxide is applied to the grid to make the positive plate. The precursor is then electrochemically oxidized to form lead dioxide.

The positive plate affects the life and current generating efficiency of the battery because they are subjected to severe cycling between oxidizing and deoxidizing reactions of the active material. Thus, grids of positive plates not only provide structural support for the active material, but also collect the current (energy) from the active material and transmit the current to lugs extending from the grid.

The cycling of positive plates leads to corrosion between the interface of the active material and the underlying grid material, know as the corrosion layer. Moreover, the positive plates expand and contract during the cycling. The combination of expansion, contraction, oxidizing reactions, and deoxidizing reactions limits the life of the positive plate, especially at elevated temperatures. Referring to FIG. 1, a prior art positive battery plate 10 is illustrated. After exposure of battery plate 10 to cycling described above, active materials 12, in the form of lead dioxide 14, exfoliates or separates from grid material 16. The cycling causes stress cracks 18 to form in active material 12 resulting in a loss of conductivity between grid 16 and the active material 12.

Surface properties of grid material 16 are often opposite the bulk properties necessary in the grid. Typically, processes and materials that strengthen the bulk properties of grid material 16 (e.g., wrought materials) damage the surface properties and lead to breaks in conductivity. Conversely, processes and materials that provide surface properties resistance to conductivity losses due to cracks (e.g., cast materials) provide little or no strength for the grid.

Conductivity losses have been abated through the use of antimony based coatings. However, antimony can cause problems in battery performance. For example during the cycling of the battery, the antimony gases and requires venting of the battery. Vented batteries have a high water loss and, thus, are typically not maintenance free batteries.

SUMMARY

A lead alloy coating for a positive grid of a lead acid battery is provided. The lead alloy coating includes a tin content of at least about 0.1%, but not more than about 3%; and a residual lead content. The lead alloy coating optionally includes a calcium content of at least about 0.01%, but not more than about 0.1%, with or without a silver content of at least about 0.01%, but not more than about 0.1%. Alternatively, the lead alloy coating optionally includes a barium content of at least about 0.01%, but not more than about 0.1%, with or without a silver content of at least about 0.01%, but not more than about 0.1%.

A coated positive grid for a lead acid battery is provided. The coated positive grid includes a wrought lead or lead alloy strip and a cast lead alloy coating. The strip has a first surface with the coating disposed thereon. The cast lead alloy coating is selected from the group consisting of binary lead-tin alloys, ternary lead-calcium-tin alloys, quaternary lead-calcium-tin-silver alloys, ternary lead-barium-tin alloys, and quaternary lead-barium-tin-silver alloys. Moreover, the strip has a linear elongated grain structure parallel to the first surface, and the cast lead alloy coating has a random grain structure. The linear elongated grain structure provides mechanical strength to the strip, while the random grain structure mitigates conductivity losses caused by cracks in the coated positive grid.

A method of coating a positive battery grid for a lead acid battery is provided. The method includes providing a first layer and a second layer to a surface coating process, and coating a surface of the first layer with the second layer to form a coated strip. The first layer is a wrought lead or lead alloy material. The second layer is a cast lead alloy material selected from the group consisting of binary lead-tin alloys, ternary lead-calcium-tin alloys, quaternary lead-calcium-tin-silver alloys, ternary lead-barium-tin alloys, quaternary lead-barium-tin-silver alloys, and quaternary lead-calcium-tin-barium alloys.

The above-described and other features and advantages of the present invention will be appreciated and understood by those skilled in the art from the following detailed description, drawings, and appended claims.

DESCRIPTION OF THE PREFERRED EMBODIMENT

Figure 1:
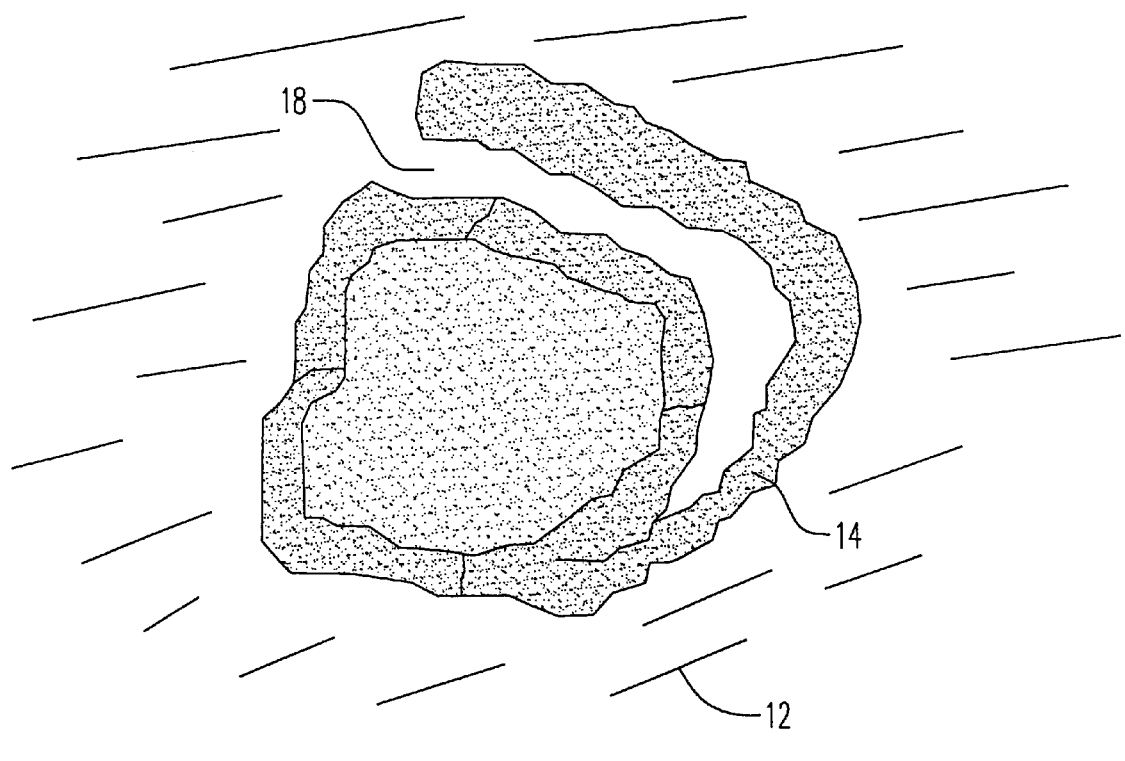
FIG. 1 is a graphic representation of conductivity loss a positive battery plate.
Figure 2:
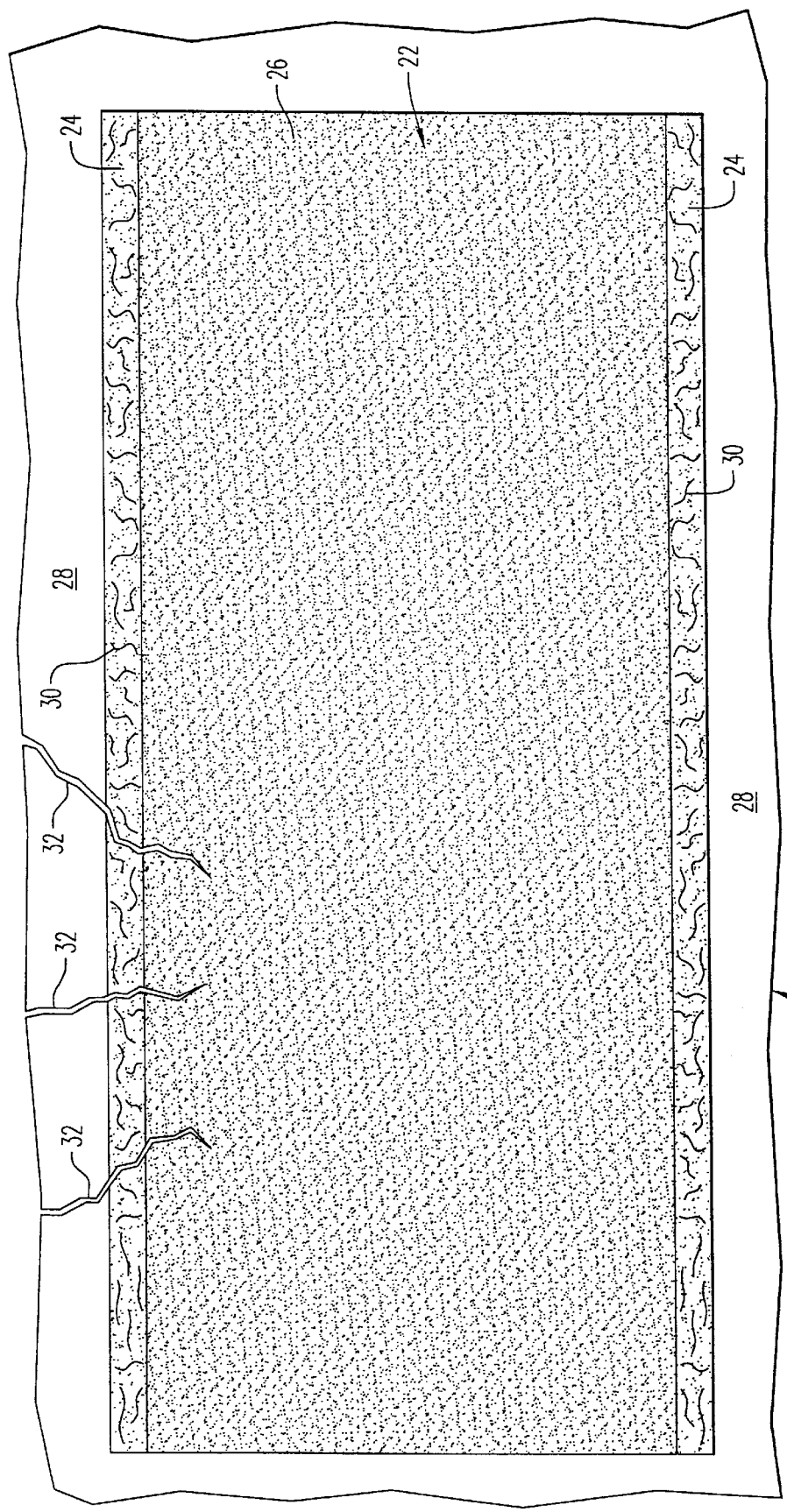
FIG. 2 shows the microstructure of an exemplary embodiment of a coated positive grid.
Figure 3:
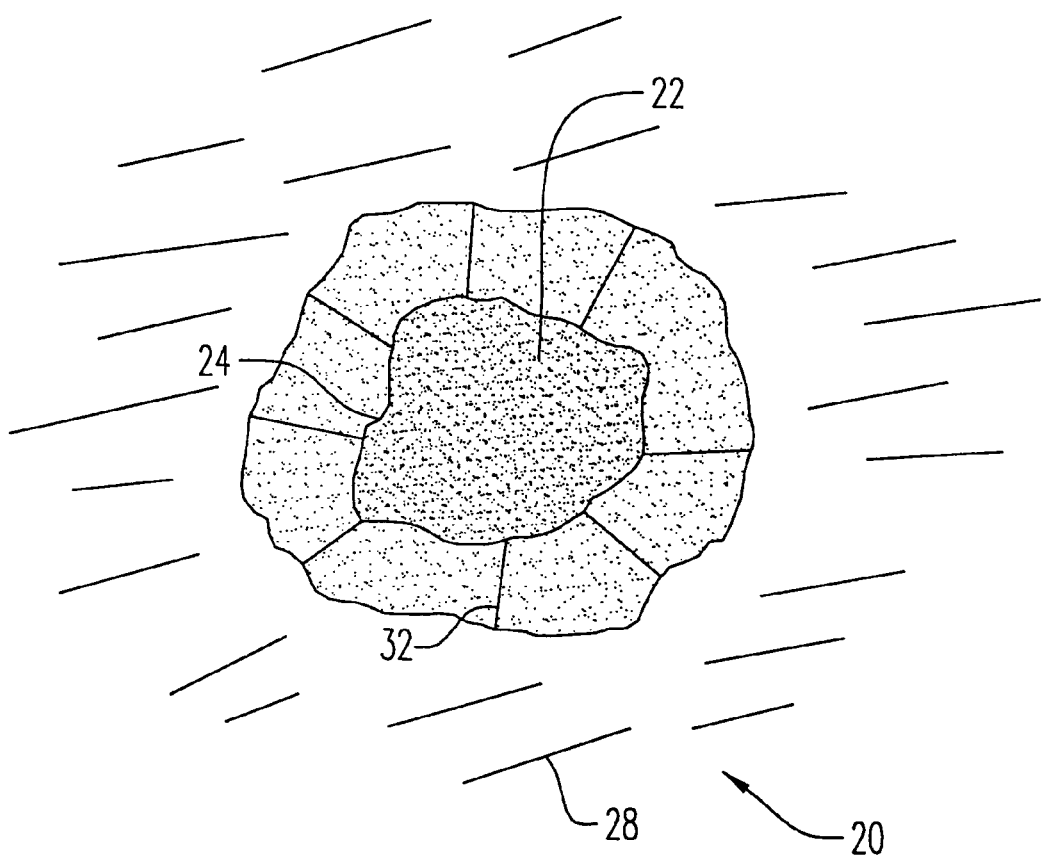
FIG. 3 is a graphic representation of the maintenance of conductivity by the coated positive grid of FIG. 2.

Referring now to FIGS. 2 and 3, a coated positive grid 20 is illustrated by way of a cross section of the microstructure of the coated positive grid in a positive battery plate 21. Here, grid 20 includes a strip 22 and a thin coating 24 disposed on either side of the strip. While coated positive grid 20 is described as including thin coating 24 on both sides of strip 22, it is considered within the scope of the invention for the coating to be on only one side of the strip.

Strip 22 is a wrought lead or lead alloy that provides structural rigidity to grid 20 by having a linear elongated grain structure 26 oriented along the length of the grid (e.g., into the page). Coating 24 is a cast lead or lead alloy that mitigates conductivity losses due to cracks by providing a random redundant grain structure 30 and promotes adhesion to an active battery material 28. Random grain structure 30 contains a uniform distribution of randomly orientated grain structure, columnar grains, and interlocking dendritical grain structure. Preferably, the composition the wrought lead or lead alloy of strip 22 is different from the composition the cast lead or lead alloy of coating 24.

As discussed above, the use of grid 20 will cause cracks 32 to form on the surface of the grid through active material 28. The grains of grid 20 (e.g., linear elongated grains 26 and random grains 30) conduct electrical current between the grid and active material 28. However, random grain structure 30 of coating 24 provides increased conductivity between grid 20 and active battery materials 28 in the presence of cracks 32. Namely, cracks 32 do not sever random redundant network of conductive grains 30 in coating 24 as illustrated in FIG. 3. Thus, cracks 32 that propagate to relieve tension in grid 20 formed from the cycling of the grid, do not affect the conductivity between the grid and active materials 28. Accordingly, linear elongated grain structure 26 in strip 22 provides mechanical strength, while random redundant grain structure 30 in coating 24 mitigates the conductivity losses caused by cracks 32.

As described above, production equipment for producing expanded metal grids are available. Such production equipment expands a strip of material along a single, longitudinal axis. Thus, grid 20 allows the use of current production equipment, without any major modification, to expand the grid as random redundant grain structure 30 of coating 24 is not sufficient to interfere with such expansion. For example, in a preferred embodiment coating 24 has a thickness of about 50 microns to about 500 microns. Of course, coating 24 having a thickness of less than 50 microns and greater than 500 microns is contemplated.

Figure 4:
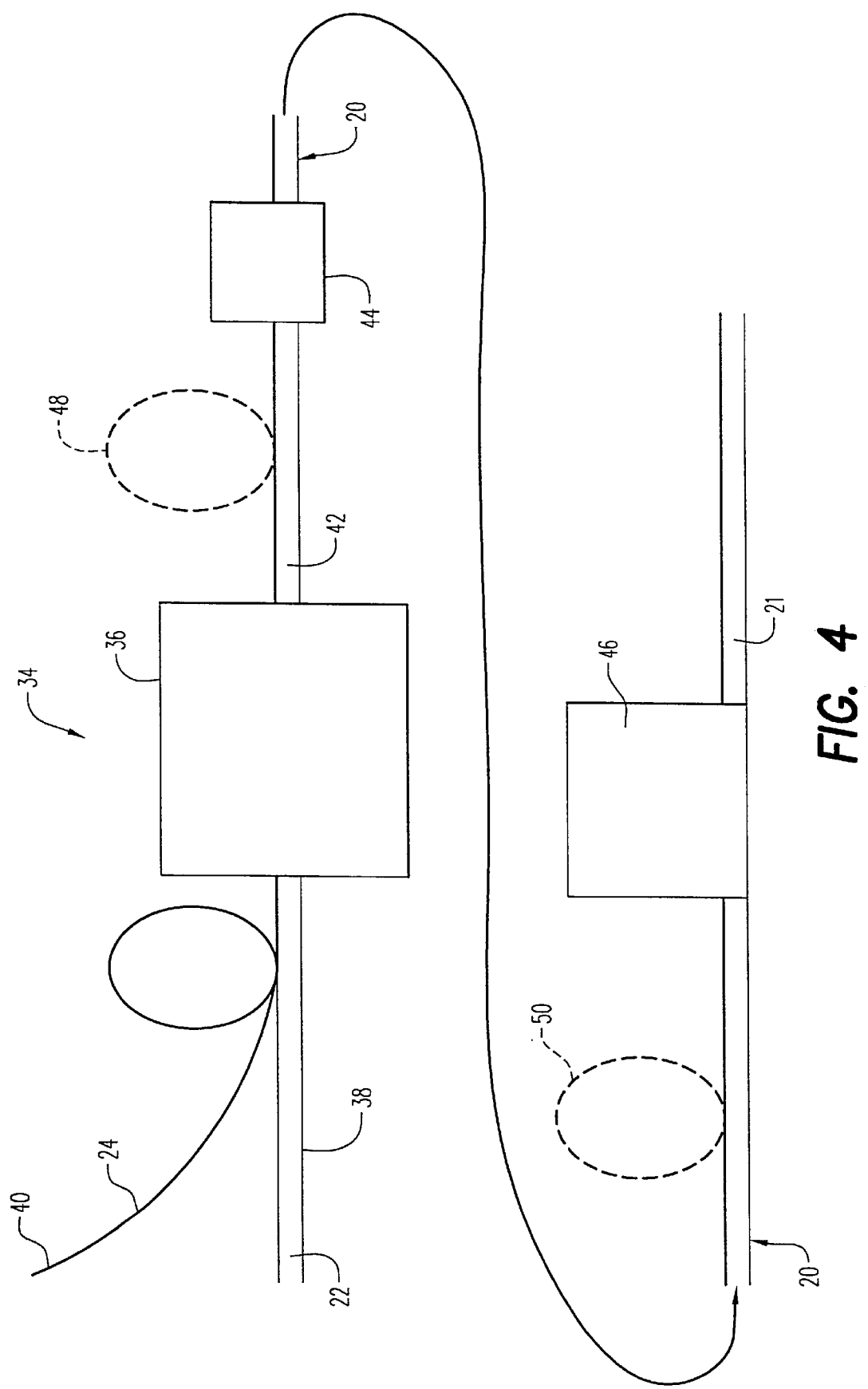
FIG. 4 is a schematic view of an exemplary embodiment of a process for making a coated positive grid.

Referring now to FIG. 4, an exemplary embodiment of a surface coating process 34 for manufacturing grid 20 is illustrated. Coating 24 has a melting point close to the melting point of strip 22. Thus, surface coating process 34 is selected so as to not melt the whole of strip 22, however minimal melting at the interface of the strip and coating 24 is acceptable. Namely, melting of strip 22 sufficient to increase the bond between the strip and coating 24 without causing the wrought strip to recrystallize is acceptable. Thus, for purposes of clarity, coating 24 is illustrated as being formed on strip 22 by a solder coating process 36. However, other surface coating processes 34 for forming coating 24 on strip 22, where the melting temperature of the coating and the strip are approximately equal and where the grain structure of the coating and the strip are not affected, are within the scope of the invention. For example, coating 24 being formed on strip 22 by a flame reflow process, thermal spray, drum/roller coating and the like are within the scope of the invention.

A continuous layer 38 of strip 22 and a continuous layer 40 of coating 24 are provided to solder coating process 36. Solder coating process 36 provides a sufficient amount of heat to melt continuous layer 40 of coating 24 on to continuous layer 38 of strip 22. A small amount of melting of strip 22 may occur at the interface of layers 38 and 40, however the heat provided by solder coating process 36 is not sufficient to recrystallize continuous layer 38 of strip 22. Namely, coating 24 is soldered onto strip 22 in a continuous fashion to form a coated strip 42.

Coated strip 42 is adapted to be further processed into grid 20 and/or positive battery plate 21. For example, coated strip 42 is feedable into an expansion machine 44 for expansion of the coated strip into grid 20. Coating 24 on grid 20 is formed only on the surface of strip 22, and, thus expansion of coated strip 42 by expansion machine 44 provides the grid with the coating only on the surface of the grid and not in any voids caused by the expansion. Moreover, grid 20 is feedable into an active material application process 46 for application of active materials to grid 20.

In an alternative embodiment and as illustrated by dotted lines in FIG. 4, coated strip 42 is fed into a pressing process 48 prior to being fed to expansion machine 44. Pressing process 48 provides sufficient pressure to cause some atoms of coating 24 to move into strip 22 for increased adhesion between the coating and the strip. However, pressing process 48 does not provide enough pressure to coated strip 42 to re-orient random redundant network of conductive grains 30 in coating 24 along the rolling direction (e.g., along linear elongated grain structure 26).

In another alternative embodiment and as illustrated by dotted lines in FIG. 4, grid 20 is fed into surface treatment process 50 prior to being fed to active material application process 46. Surface treatment process 50 provides a roughed surface to grid 20 prior to application of active material 28. Surface treatment process 50 such as, but not limited to, knurling and surface roughing aids in the adhesion of active material 28 to grid 20. Surface treatment process 50 is sufficient to rough coating 24 without interfering with the increased conductivity provided by random grain structure 30 of the coating 24. Namely, surface treatment process 50 preferably does not penetrate coating 24 into strip 22. It should be noted that surface treatment process 50 is illustrated by way of example as being after expansion machine 44, however surface treatment process 50 being before the expansion machine is considered within the scope of the invention.

Figure 5:
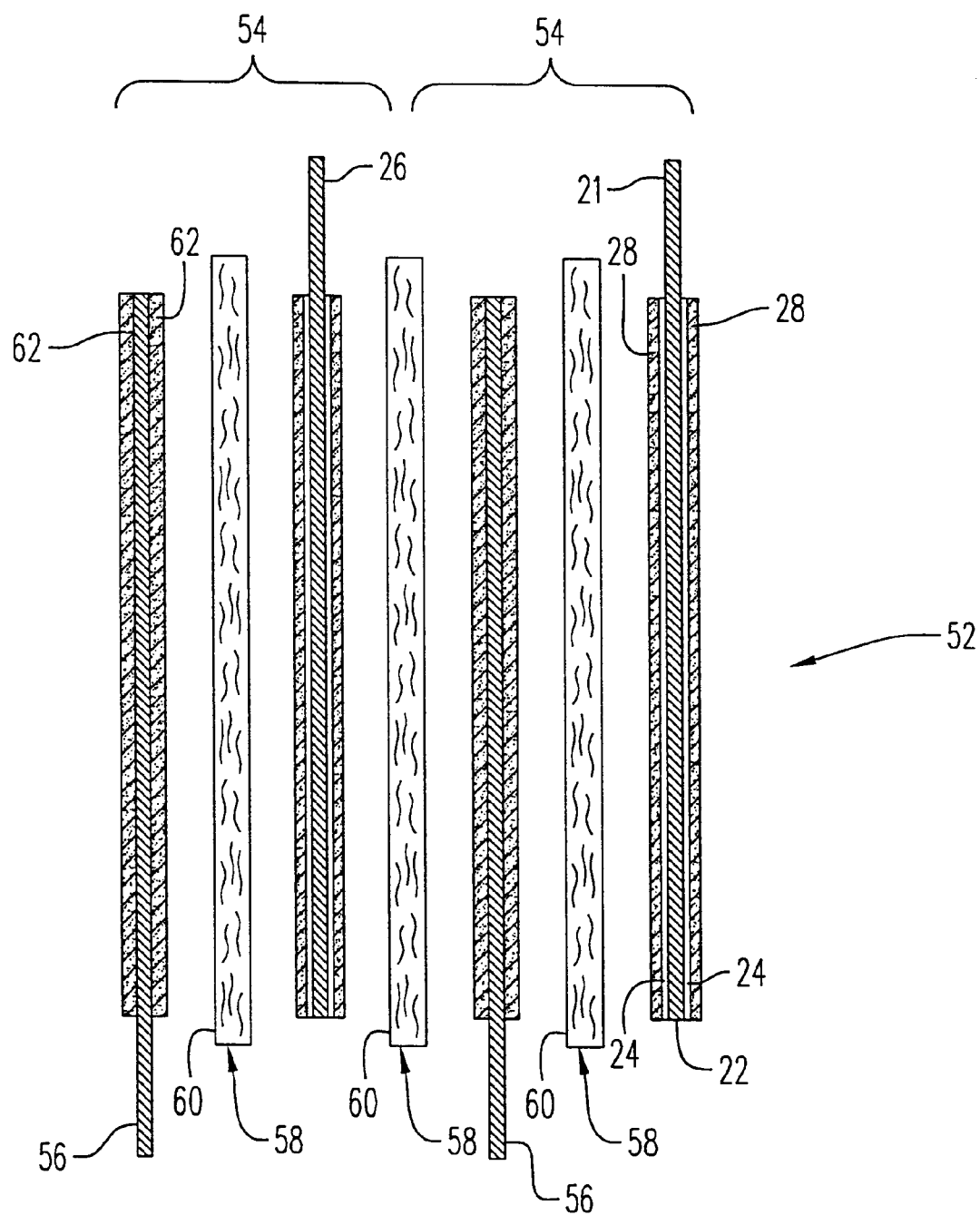
FIG. 5 is a schematic view of an exemplary embodiment of a battery having the coated positive grid of FIG. 2.

Referring now to FIG. 5, an exemplary embodiment of a lead acid battery 52 having grid 20 is illustrated. Battery 52 is a multi-cell structure with each cell 54 containing positive plate 21, a negative plate 56, and electrolyte 58. In the example of FIG. 5, electrolyte 58 is provided in porous separators 60. It should be recognized that electrolyte 58 being provided in liquid form, gel form, and/or solid form are considered within the scope of the invention. Battery 52 is illustrated as having two cells 54, however batteries including more or less cells are considered within the scope of the invention. Positive plate 21 includes active material 28, while negative plate 56 includes active material 62.

Coating 24 is a non-antimony lead alloy. Thus, battery 52 is a maintenance free battery, namely the battery does not require venting. More specifically, in a first exemplary embodiment coating 24 is a binary lead-tin alloy. Preferably, the binary lead-tin alloy has a tin content of at least about 0.1%, but not more than about 3%. For example, in a preferred embodiment coating 24 is a binary lead-tin alloy having a tin content of about 1.5%.

In a second exemplary embodiment coating 24 is a ternary lead alloy. The ternary alloy is a ternary lead-calcium-tin alloy having a tin content of at least about 0.1%, but not more than about 3%, and a calcium content of at least about 0.01%, but not more than about 0.1%. For example, in a preferred embodiment coating 24 is a ternary lead-calcium-tin alloy having a tin content of about 1.5%, and a calcium content of about 0.7%.

Alternately, the ternary alloy is a ternary lead-barium-tin alloy having a tin content of at least about 0.1%, but not more than about 3%, and a barium content of at least about 0.01%, but not more than about 0.1%. For example, in a preferred embodiment coating 24 is a ternary lead-barium-tin alloy having a tin content of about 1.5%, and a barium content of about 0.05%.

In a third exemplary embodiment coating 24 is a quaternary alloy. The quaternary alloy is a quaternary lead-calcium-tin-silver alloy having a tin content of at least about 0.1%, but not more than about 3%, a calcium content of at least about 0.01%, but not more than 0.1%, and a silver content of at least about 0.01%, but not more than about 0.1%. For example, in a preferred embodiment coating 24 is a quaternary lead-calcium-tin-silver alloy having a tin content of about 1.5%, a calcium content of about 0.07%, and a silver content of about 0.05%.

Alternately, the quaternary alloy is a quaternary lead-barium-tin-silver alloy having a tin content of at least about 0.1%, but not more than about 3%, a barium content of at least about 0.01%, but not more than 0.1%, and a silver content of at least about 0.01%, but not more than about 0.1%. For example, in a preferred embodiment coating 24 is a quaternary lead-barium-tin-silver alloy having a tin content of about 1.5%, a barium content of about 0.05%, and a silver content of about 0.05%.

Alternatively, the quaternary alloy is a quaternary lead-calcium-tin-barium alloy having a tin content of at least about 0.1%, but not more than about 3%, a calcium content of at least about 0.01%, but not more than 0.1%, and a barium content of at least about 0.01%, but not more than about 0.1%. For example, in a preferred embodiment coating 24 is a quaternary lead-calcium-tin-barium alloy having a tin content of about 1.5%, a calcium content of about 0.07%, and a barium content of about 0.05%.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lead alloy coating for a positive grid of lead acid battery, comprising:
   a tin content of at least about 0.1%, but not more than about 3%;
   a calcium content of at least about 0.01%, but not more than about 0.1%; and
   a silver content of at least about 0.01%, but not more than about 0.1%, said tin content, said calcium content, said silver content, and said residual lead content forming a quaternary lead-calcium-tin-silver alloy.

2. The lead alloy of claim 1, wherein said tin content is about 1.5%.

3. The lead alloy of claim 1, wherein said tin content is about 1.5%, and said calcium content is about 0.07%.

4. The lead alloy of claim 1, wherein said tin content is about 1.5%, said calcium content is about 0.07%, and said silver content is about 0.05%.

5. A lead alloy coating for a positive grid of a lead acid battery, comprising:
   a tin content of at least about 0.1%, but not more than about 3%; and
   a barium content of at least about 0.01%, but not more than about 0.1%, said tin content, said barium content, and a residual lead content forming a ternary lead-barium-tin alloy.

6. The lead alloy of claim 5, wherein said tin content is about 1.5%, and said barium content is about 0.05%.

7. The lead alloy of claim 5, further comprising:
   a silver content of at least about 0.01%, but not more than about 0.1%, said tin content, said barium content, said silver content, and said residual lead content forming a quaternary lead-barium-tin-silver alloy.

8. The lead alloy of claim 7, wherein said tin content is about 1.5%, said barium content is about 0.05%, and said silver content is about 0.05%.

9. A coated positive grid for lead acid battery comprising:
   a wrought lead or lead alloy strip having a first surface; and
   a cast lead alloy coating disposed on said first surface, said cast lead alloy coating being selected from the group consisting of binary lead-tin alloys ternary lead-calcium-tin alloys, quaternary lead-calcium-tin-silver alloys, ternary lead-barium-tin alloys, quaternary lead-barium-tin-silver alloys, and quaternary lead-calcium-tin-barium alloys, wherein said strip has a linear elongated grain structure parallel to said first surface, and said cast lead alloy coating has a random grain structure, said linear elongated grain structure providing mechanical strength to said strip and said random grain structure mitigating conductivity losses caused by cracks formable in the coated positive grid.

10. The coated positive grid of claim 9, further comprising:
    a roughened surface on said cast lead alloy coating opposite said first surface for promoting adhesion between said cast lead alloy coating and an active battery material.

11. The coated positive grid of claim 9, wherein said cast lead alloy coating has a thickness of about 50 microns to about 500 microns.

12. The coated positive grid of claim 9, wherein said binary lead-tin alloy consists of:
    a tin content of at least about 0.1%, but not more than about 3%; and
    a residual lend content.

13. The coated positive grid of claim 9, wherein said ternary lead-calcium-tin alloy consists of:
    a calcium content of at least about 0.01%, but not more than about 0.1%;
    a tin content of at least about 0.1%, but not more than about 3%; and
    a residual lead content.

14. A coated positive grid for a lead acid battery, comprising:
    a wrought lead or lead alloy strip having a first surface; and a cast lead alloy coating disposed on said first surface, said cast lead alloy coating being a quaternary lead-calcium-tin-silver alloy, wherein said quaternary lead-calcium-tin-silver alloy consists of:
    a calcium content of at least about 0.01%, but not more than about 0.1%;
    a tin content of at least about 0.1%, but not more than about 3%;
    a silver content of at least about 0.01%, but not more than about 0.1%; and
    a residual lead content.

15. A coated positive grid for a lead acid battery, comprising:
a wrought lead or lead alloy strip having a first surface; and a cast lead alloy coating disposed on said first surface said cast lead alloy coating being a ternary lead-barium-tin-alloy, wherein said ternary lead-barium-tin alloy consists of:
a barium content of at least about 0.01%, but not more than about 0.1%;
a tin content of at least about 0.1%, but not more than about 3%; and
a residual lead content.

16. A coated positive grid for a lead acid battery, comprising:
a wrought lead or lead alloy strip having a first surface; and a cast lead alloy, coating disposed on said first surface, said cast lead alloy coating being quaternary lead-barium-tin-silver alloy, wherein said quaternary lead-barium-tin-silver alloy consists of:
a barium content of at least about 0.01%, but not more than about 0.1%;
a tin content of at least about 0.1%, but not more than about 3%;
a silver content of at least about 0.01%, but not more than about 0.1%, and
a residual lead content.

17. A coated positive grid for a lead acid battery, comprising:
a wrought lead or lead alloy strip having a first surface; and a cast lead alloy coating disposed on said first surface, said cast lead alloy coating being a quaternary lead-calcium-tin-barium alloy, wherein said quaternary lead-calcium-tin-barium alloy consists of:
a calcium content of at least about 0.01%, but not more than about 0.1%;
a tin content of at least about 0.1%, but not more than about 3%;
a barium content of at least about 0.01%, but not more than about 0.1%, and
a residual lead content.

18. A method of coating a positive battery grid for a lead acid battery, comprising:
providing a first layer to a surface coating process, said first layer being a wrought lead or lead alloy material;
providing a second layer to said surface coating process, said second layer being a cast lead alloy material, wherein said surface coating process provides heat to melt said second layer onto said first layer, said heat being insufficient to recrystallize said wrought lead or lead alloy material of said first layer;
coating a surface of said first layer with said second layer to form a coated strip, said cast lead alloy material being selected from the group consisting of binary lead-tin alloys, ternary lead-calcium-tin alloys, quaternary lead-calcium-tin-silver alloys, ternary lead-barium-tin alloys, and quaternary lead-barium-tin-silver alloys;
feeding said coated strip to a pressing process to increase adhesion between said first layer and said second layer, wherein said pressing process does not re-orient a random grain structure of said second layer.

19. The method of claim 18, wherein said surface coating process is selected from the group consisting of solder coat processes, flame reflow processes, thermal spraying, and drum/roller coating processes.

20. The method of claim 18, wherein said binary lead-tin alloy consists of:
a tin content of at least about 0.1%, but not more than about 3%; and
a residual lead content.

21. The method of claim 18, wherein said ternary lead-calcium-tin alloy consists of:
a calcium content of at least about 0.01%, but not more than about 0.1%;
a tin content of at least about 0.1%, but not more than about 3%; and
a residual lead content.

22. A method of coating a positive battery grid for a lead acid battery, comprising:
providing a first layer to surface coating process, said first layer being a wrought lead or lead alloy material;
providing a second layer to said surface coating process, said second layer being a cast lead alloy material; and
coating a surface of said first layer with said second layer to form a coated strip, said cast lead alloy material being a quaternary lead-calcium-tin-silver alloy, wherein said quaternary lead-calcium-tin-silver alloy consists of:
a calcium content of at least about 0.01%, but not more than about 0.1%;
a tin content of at least about 0.1%, but not more than about 3%;
a silver content of at least about 0.01%, but not more than about 0.1%; and
a residual lead content.

23. A method of coating a positive battery grid for a lead acid battery, comprising:
providing a first layer to a surface coating process, said first layer being a wrought lead or lead alloy material;
providing a second layer to said surface coating process, said second layer being a cast lead alloy material; and
coating a surface of said first layer with said second layer to form a coated strip, said cast lead alloy material being a ternary lead-barium-tin alloy, wherein said ternary lead-barium-tin alloy consists of:
a barium content of at least about 0.01%, but not more than about 0.1%;
a tin content of at least about 0.1%, but not more than about 3%; and
a residual lead content.

24. A method of coating a positive battery grid for a lead acid battery, comprising:
providing a first layer to a surface coating process, said first layer being a wrought lead or lead alloy material;
providing a second layer to said surface coating process, said second layer being a cast lead alloy material; and
coating a surface of said first layer with said second layer to form a coated strip, said cast lead alloy material being a quaternary lead-barium-tin-silver alloy, wherein said quaternary lead-barium-tin-silver alloy consists of:
a barium content of at least about 0.01%, but not more than about 0.1%;
a tin content of at least about 0.1%, but not more than about 3%;
a silver content of at least about 0.01%, but not more than about 0.1%, and
a residual lead content.

25. A method of coating a positive battery grid for a lead acid battery, comprising:

providing a first layer to a surface coating process, said first layer being a wrought lead or lead alloy material;

providing a second layer to said surface coating process, said second layer being a cast lead alloy material; and coating a surface of said first layer with said second layer to form a coated strip, said cast lead alloy material being a quaternary lead-calcium-tin-barium alloy, wherein said quaternary lead-calcium-tin-barium alloy consists of:

a calcium content of at least about 0.01%, but not more than about 0.1%;

a tin content of at least about 0.1%, but not more than about 3%;

a barium content of at least about 0.01%, but not more than about 0.1%, and a residual lead content.

* * * * *